(12) United States Patent
Metzler et al.

(10) Patent No.: US 10,890,447 B2
(45) Date of Patent: Jan. 12, 2021

(54) DEVICE, SYSTEM AND METHOD FOR DISPLAYING MEASUREMENT GAPS

(71) Applicant: HEXAGON TECHNOLOGY CENTER GMBH, Heerbrugg (CH)

(72) Inventors: Bernhard Metzler, Dornbirn (AT); Rune Fjellvang, Oslo (NO)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 360 days.

(21) Appl. No.: 16/006,620

(22) Filed: Jun. 12, 2018

(65) Prior Publication Data
US 2018/0356222 A1 Dec. 13, 2018

(30) Foreign Application Priority Data

Jun. 12, 2017 (EP) ..................................... 17175589

(51) Int. Cl.
*G01C 15/00* (2006.01)
*G06T 19/00* (2011.01)
(Continued)

(52) U.S. Cl.
CPC ........... *G01C 15/00* (2013.01); *G01C 15/002* (2013.01); *G06T 11/60* (2013.01); *G06T 19/006* (2013.01);
(Continued)

(58) Field of Classification Search
CPC ........... G06K 9/3216; G06T 7/35; G06T 7/70; G06T 19/006; G06T 2200/24;
(Continued)

(56) References Cited

U.S. PATENT DOCUMENTS 10,127,723 B2 * 11/2018 Miller ..................... G06F 3/013
10,146,194 B2 * 12/2018 Todeschini ......... G02B 27/0172
(Continued)

FOREIGN PATENT DOCUMENTS

CN 102840838 A 12/2012
CN 102959355 A 3/2013
(Continued)

OTHER PUBLICATIONS

European Search Report in application No. 17 17 5589 dated Dec. 7, 2017.

*Primary Examiner* — Elias Desta
(74) *Attorney, Agent, or Firm* — Maschoff Brennan

(57) ABSTRACT

An Augmented Reality (AR)-device, including a visual sensor configured for capturing an environment of the AR device, a display configured for providing a real view of the environment, and overlays onto the real view according to AR-data, wherein the AR data are spatially linked to a reference system and comprise designed data, measured data, and remeasurement indications, a computer configured for reading and controlling the visual sensor, determining a pose of the AR-device relative to the reference system, at least one of receiving, generating and storing the AR-data, and generating the overlays. The remeasurement indications are based on an evaluation of the measured data, and spatially linked to the reference system at corresponding locations of the environment where the measured data lack a target quality.

15 Claims, 3 Drawing Sheets

(51) Int. Cl.
 *G06T 11/60* (2006.01)
 *G06T 7/70* (2017.01)
(52) U.S. Cl.
 CPC ............ *G06T 7/70* (2017.01); *G06T 2200/24* (2013.01); *G06T 2207/30244* (2013.01)
(58) Field of Classification Search
 CPC .......... G06T 2207/30244; G01T 11/60; G01C 15/00; G01C 15/002
 See application file for complete search history.

(56) References Cited

U.S. PATENT DOCUMENTS

| | | |
|---|---|---|
| 2012/0256901 A1 | 10/2012 | Bendall |
| 2013/0121564 A1 | 5/2013 | Kitamura et al. |
| 2013/0176305 A1 | 7/2013 | Ito et al. |
| 2013/0222544 A1 | 8/2013 | Roland et al. |
| 2014/0210947 A1 | 7/2014 | Finn et al. |
| 2016/0112643 A1 | 4/2016 | Laffargue et al. |

FOREIGN PATENT DOCUMENTS

| | | |
|---|---|---|
| CN | 103003666 A | 3/2013 |
| CN | 105190232 A | 12/2015 |
| CN | 106 017 436 A | 10/2016 |
| EP | 3 086 283 A1 | 10/2016 |
| EP | 3246660 A1 | 11/2017 |
| WO | 2014/149702 A1 | 9/2014 |
| WO | 2015/169338 A1 | 11/2015 |

\* cited by examiner

DEVICE, SYSTEM AND METHOD FOR DISPLAYING MEASUREMENT GAPS

CROSS-REFERENCE TO RELATED APPLICATIONS

This application claims priority to European Patent Application No. 17175589 filed on Jun. 12, 2017. The foregoing patent application are incorporated herein by reference.

FIELD OF INVENTION

The present invention relates to an Augmented Reality (AR)-device, surveying system, method, and computer programme product.

BACKGROUND

The technical fields of the present invention are metrology, geodesy and civil engineering. Accordingly, typical application areas of the present invention are production halls, measuring rooms, construction sites, excavation sites, or any other land, buildings and/or objects to be surveyed.

In these arts, it is of particular interest for persons at said application areas to get visualised information on survey jobs already performed or survey jobs planned to be performed. As a trending technology, Augmented Reality (AR) is an advanced way to provide such information to users, and thus, surveying systems are already popular auxiliaries in the mentioned technical fields for supporting users with referenced visualisations of AR-data, such as measurement data (e.g. point clouds), descriptive texts, descriptive numbers, instructions, check plans, surveying plans, two- or three-dimensional objects, navigational indications, navigational maps, images, and/or video clips.

In order to overlay the AR-data at the correct place within a display of an AR-device, such as within a head-mounted display (HMD) of an AR helmet or within a screen of a tablet computer, so that an observer (the user of the AR-device) perceives the AR-data as being spatially linked to his environment, a pose of the AR-device relative to a reference system is detected permanently. These overlays augment the reality with artificial visualisations. Known referencing procedures are image based determinations of the pose of the AR-device relative to the reference system which itself has a known pose. For example, such pose detections can be achieved by computer vision, in particular image resection. Common means for referencing an AR-device relative to a reference system are markers, in particular QR-markers, or characteristic physical features distinctive by according image features.

In the mentioned work environment, the complexity of information and with that the volumes of data are growing such that clarity and comprehensibility emerge as serious challenges. Evermore, users are relying on assistive means to regain overview in order to fulfil jobs in time, in the right quality, and completely.

BRIEF DESCRIPTION

It is therefore an object of some embodiments of the present invention to provide an AR-device, an Surveying system and a method allowing for a more ergonomic user-experience regarding AR-visualisations. In particular, it is an object to provide an AR-device, a Surveying system and a method allowing for a more overseeable and more purposeful job assignment AR-visualisations.

At least one of these improvements is achieved by at least one of the AR-device according to claim 1, the surveying system according to claim 7, the method according to claim 9, the computer programme product according to claim 15, and the dependent claims of the present invention.

Some embodiments of the invention relate to an Augmented Reality (AR)-device, comprising a visual sensor configured for capturing an environment of the AR device; a display configured for providing a real view of the environment, and overlays onto the real view according to AR-data, wherein the AR data are spatially linked to a reference system and comprise designed data, measured data, and remeasurement indications; a computer configured for reading and controlling the visual sensor, determining a pose of the AR-device relative to the reference system, at least one of receiving, generating and storing the AR-data, and generating the overlays; wherein the remeasurement indications are based on an evaluation of the measured data, and spatially linked to the reference system at corresponding locations of the environment where the measured data lack a target quality. The computer may be configured to control the display, or to control a projector, which is configured to project the AR-data onto the display.

The AR-data may further comprise remeasurement instructions which are based on an analysis of the remeasurement indications in context of the structure of the environment, and spatially linked to the reference system at corresponding locations of the environment where a surveying instrument is required to be set up for a remeasurement.

The evaluation may be adapted to match the quality of the measured data with the target quality.

The AR-device may further comprise a pose sensor configured for tracking a position and an orientation of the AR-device, wherein the computer may be configured for reading and controlling the pose sensor.

The computer may further be configured for performing a Visual Simultaneous Localisation and Mapping (VSLAM)-process. This VSLAM-process may be based on images captured with the visual sensor. The VSLAM-process may be supported by pose data outputted by the pose sensor. The VSLAM-process may be utilised to at least one of establish and maintain a referenced status of the AR-device relative to the reference system. The VSLAM-process may also be utilised to obtain measured data by generating a point cloud of the structure of the environment.

The computer may be configured for at least one of receiving results of the evaluation, receiving results of the analysis, processing the evaluation, and processing the analysis.

Some embodiments of the invention also relate to a surveying system, comprising an AR-device according to the description herein, and a surveying instrument configured for generating measured data of the environment and transmitting the measured data to the AR-device. The surveying instrument particularly is a laser scanner, theodolite, or a total station. The surveying instrument may comprise a computer and may be wirelessly connected to the AR-device.

The surveying system may also comprise a server, which may also comprise a computer and may be wirelessly connected to at least one of the AR-device and the surveying instrument.

At least one of the surveying instrument and the computer of the server may be configured for at least one of processing the evaluations, transmitting the results of the evaluation to the AR-device, processing the analysis, and transmitting the results of the analysis to the AR-device. In particular, at least one of the computer of the surveying instrument and the computer of the server is configured for processing at least one of the evaluation and the analysis.

Some embodiments of the invention also relate to a method for providing indications of locations to be remeasured to a user of one of an AR-device according to the description herein, and a surveying system according to the description herein, the method comprising the steps: evaluating the measured data in terms of quality, generating the remeasurement indications based on the evaluation of the measured data, wherein the remeasurement indications are spatially linked to the reference system at corresponding locations of the environment where the measured data lack a target quality, providing the remeasurement indications as overlays on the display of the AR-device.

At least one of evaluating the measured data and generating the remeasurement indications may be performed by a computer of at least one of the AR-device, the surveying instrument of the surveying system, and a server, which each may comprise a computer configured for the mentioned steps.

The method may further comprise the steps analysing the remeasurement indications in context of the structure of the environment, and generating the remeasurement instructions based on the analysis of the remeasurement indications, wherein the remeasurement instructions are spatially linked to the reference system at corresponding locations of the environment where a surveying instrument is required to be set up for a remeasurement.

At least one of analysing the remeasurement indications generating the remeasurement instructions may be performed by a computer of at least one of the AR-device, the surveying instrument of the surveying system, and a server, which each may comprise a computer configured for the mentioned steps.

The measured data may be provided to the AR-device by at least one of generating the measured data with the visual sensor of the AR device, generating the measured data with the surveying instrument and transmitting the measured data from the surveying instrument to the AR-device, transmitting the measured data from a server to the AR-device, and storing the measured data on the computer of the AR-device.

The results of the evaluation may be provided to the AR device by at least one of processing the evaluation with the computer of the AR-device, and receiving the results of the evaluation with the AR device from at least one of the surveying instrument of the surveying system and a server.

The results of the analysis may be provided to the AR device by at least one of processing the analysis with the computer of the AR device, and receiving the results of the analysis with the AR device from at least one of the surveying instrument of the surveying system and a server.

The method may further comprise at least one of the steps
- determining a pose of the AR-device relative to the reference system,
- generating and providing overlays according to the remeasurement indications onto a real view of the environment provided by a display of the AR-device, wherein the remeasurement indications are spatially linked to the reference system,
- generating and providing overlays according to the remeasurement instructions onto the real view of the environment provided by a display of the AR-device, wherein the remeasurement instructions are spatially linked to the reference system,
- reading and controlling a visual sensor of the AR-device,
- reading and controlling a pose sensor of the AR-device, and
- performing a Visual Simultaneous Localisation and Mapping (VSLAM)-process.

Some embodiments of the invention further relate to a computer programme product having computer-executable instructions for controlling and executing a method according to the description herein, in particular when being run by a computer of an AR-device according to the description herein.

BRIEF SUMMARY OF THE DRAWINGS

In the following, the invention will be described in detail by referring to exemplary embodiments that are accompanied by figures, in which.

DETAILED DESCRIPTION

Figure 1A:
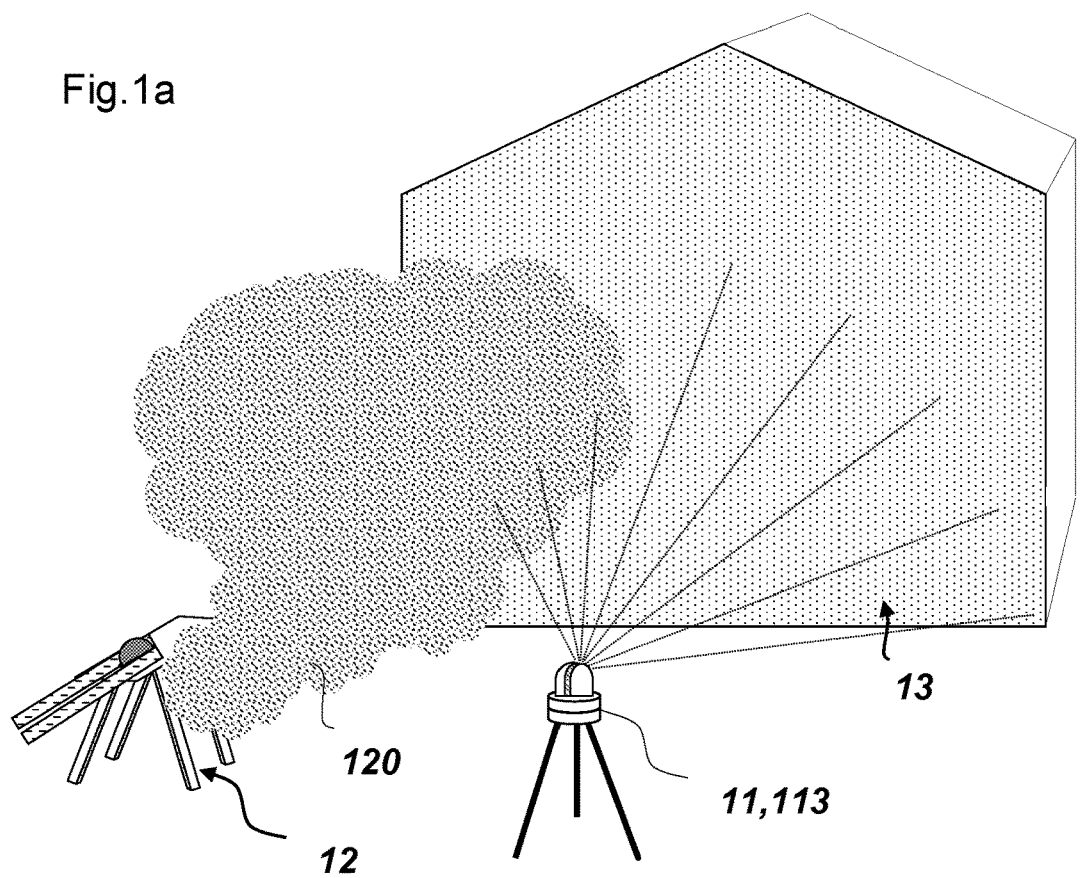
FIG. 1a-b: show an exemplary surveying situation which leads to unsatisfactory measured data.

FIG. 1a shows a scene with a house front to be measured by a laser scanner 11. As an exemplary obstacle, a disk saw 12 is raising dust 120 which covers direct sight of the object to be measured from the perspective of the laser scanner 11. Since the dust 120 is porous, some measuring laser beams get through and some do not.

Figure 1B:
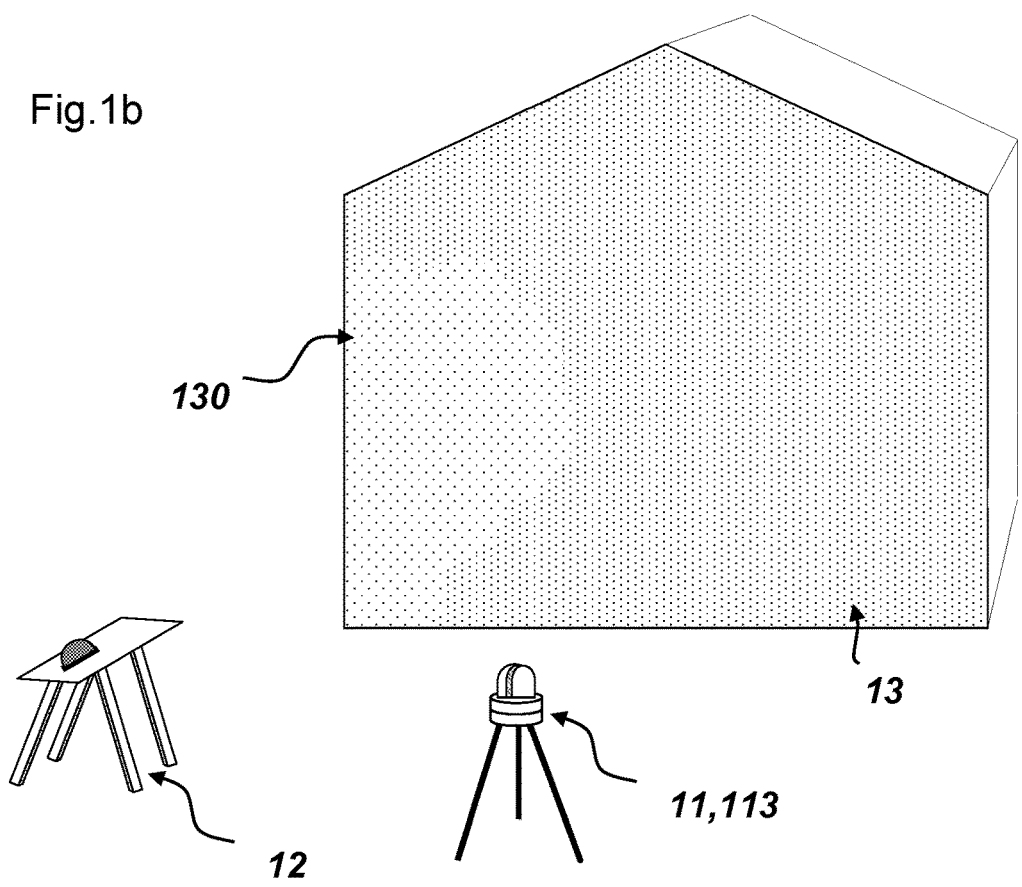

In the situation shown in FIG. 1b, the dust has settled. As a consequence of the disturbed situation (FIG. 1a), the measured data 13 comprise areas 130 which have a low density, as is shown in FIG. 1b.

Figure 1C:
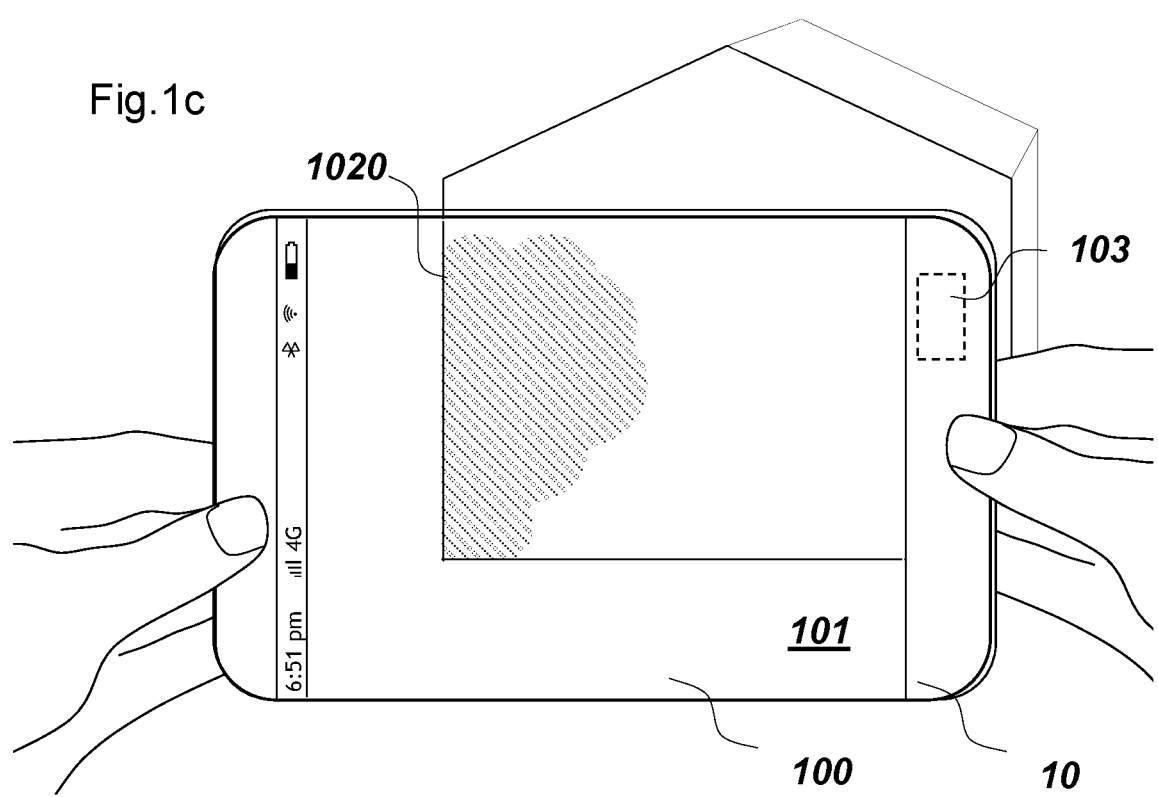
FIG. 1c: shows a first embodiment of an AR-device, a surveying system, and a method according to the invention.

A user is notified about this defect 130 in the measured data 13 by an Augmented-Reality (AR)-device 10 according to the invention. As shown in FIG. 1c, this AR-device may be a handheld computer device, such as a smart phone or tablet PC, being referenced relative to the environment and therefore capable of overlaying AR-data onto the camera output 101 on the display 100 of the AR-device 10. According to the invention, the AR-data comprise remeasurement indications 1020. The remeasurement indications 1020 are representing said defective areas 130 of the measured data 13.

As the AR-device is continuously referenced in real-time with regard to a reference system, and the AR-data are spatially linked to the reference system, the remeasurement indications 1020 are overlaid at the corresponding location of the display 100 to precisely indicate where the measured data lack a target quality, and in particular where a remeasurement should accordingly take place.

One embodiment of the surveying system according to the invention may comprise the shown AR-device 10 and the shown surveying instrument 11. The AR-device and the surveying instrument are adapted for cooperating in that measured data generated by the surveying instrument are transmitted to the AR-device, e.g. by wireless technologies like wi-fi, radio link, and/or bluetooth. The computer of the AR-device may be configured to evaluate these measured data with respect to their quality, and generate the remeasurement indications out of it.

Alternatively, the AR-device and the surveying instrument are adapted for cooperating in that the results of the evaluation of the measured data or even the remeasurement indications are transmitted to the AR-device. In this case, the surveying instrument is configured to evaluate the measured data or even to generate the remeasurement indications.

Both AR-device and surveying instrument are each configured to establish a referenced status relative to the reference system, so that the measured data are spatially linked to the reference system, and the pose of the AR-device is continuously determined relative to the reference system. Therefore, the remeasurement indications and remeasurement instructions are spatially linked to the reference system as well.

The reference system can be defined by the setup of the surveying instrument, i.e. the AR-device is establishing a referenced status with respect to the surveying instrument.

All measurement data per se are given in the (local) reference system of the surveying instrument.

For example, the referencing method presented in European Patent Application EP 16 170 479 can be used.

AR-data other than the measured data and the remeasurement indications, i.e. designed data such as descriptive texts, descriptive numbers, instructions, check plans, surveying plans, two- or three-dimensional objects, navigational indications, navigational maps, images, and video clips may be provided to the AR-device by a server which is linked to at least the AR-device and optionally also to the surveying instrument. According to the AR-data, the computer of the AR-device is configured for generating overlays for the display of the AR-device.

One embodiment of the method according to the invention provides indications of objects 130 to be remeasured to a user of the shown AR-device 10. Another embodiment of the inventive method provides such remeasurement indications to a user of the above described surveying system, which comprises the shown AR-device 10 and the shown surveying instrument 11.

In said method, the measured data 13 are evaluated in terms of quality. As described above, this evaluation may take place on the surveying instrument (by means of a computer 113 thereof), on the AR-device (by means of the computer 103 thereof), or on a server. The quality of the measured data may for example refer to a measurement point density or to a digitised waveform of the measurement points. The quality evaluation of the measured data may be liable to an absolute criterion (e.g. a specific amount of points per $cm^2$) or a relative criterion (e.g. a statistical mean value of the adjacent region or of the whole point cloud). The quality evaluation may also be based on a countercheck with a photographic image of the measured scene captured by the visual sensor of the AR-device or a visual sensor comprised by a surveying instrument.

Furthermore, the quality evaluation may additionally or optionally be based on the "age" of the measured data, wherein an evaluation criterion may e.g. be a relative or an absolute expiry date associated to measured data. The age of measured data may be significant in monitoring processes where a measurement needs to be repeated within defined time intervals. Thus, a specific embodiment of the AR-device can warn in case that measured data are outdated (too old to be reliable) and therefore lack a target quality. The remeasurement indications may further refer to a time when the measured data have been acquired or a time when the next measurement is due.

Based on the evaluation of the measured data, remeasurement indications are generated, either by the AR-device, the surveying instrument, or a server. The remeasurement indications are spatially linked to the reference system at corresponding locations of the environment where the measured data lack a target quality. Referring to FIG. 1b, this is the case in the area 130. These remeasurement indications are then provided on the display 100 of the AR-device 10 as overlay (e.g. as highlighted or coloured area) 1020. This will notify the user of the AR-device in a simple and ergonomic way, where the existing measured data are insufficient and, accordingly, where a remeasurement should take place.

The named different types qualities, i.e. measurement gaps, low-density, low-accuracy, outdated measurements, may be visualised in different appearance, in particular different colours of the overlay.

Figure 1D:
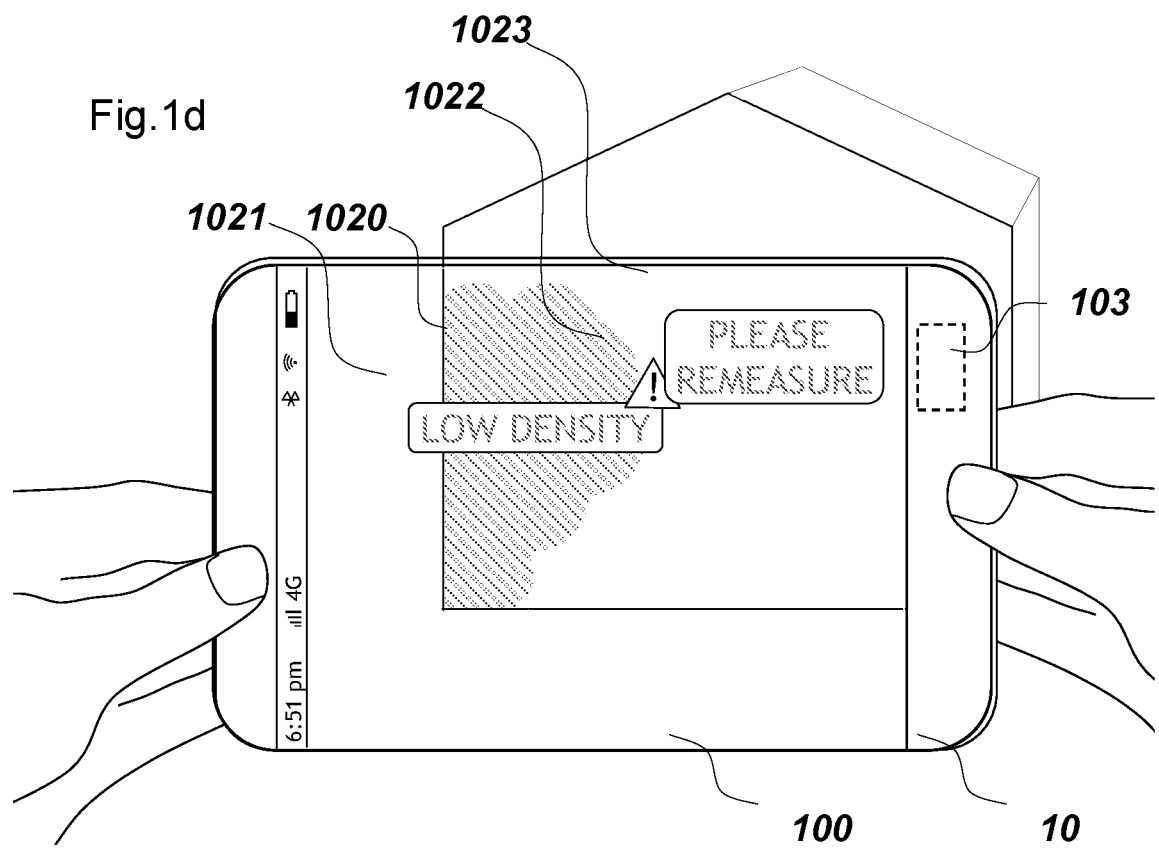
FIG. 1d: shows a second embodiment of an AR-device, a surveying system, and a method according to the invention.

In a particular embodiment of the inventive AR-device, surveying system, or method, respectively, as shown in FIG. 1d, the AR-device can be configured to show more specific remeasurement indications 1021, 1022, and 1023. The remeasurement indication 1020 described above may be tagged with a short explanation for why the measured data 13 are defective in the area 130. In the shown case, the point cloud has a poor density which is shown with a remeasurement indication 1021. Optionally a further indication 1022 may be overlaid, e.g. in form of a warning sign, which—when tapped—unfolds a detailed remeasurement indication 1023 explaining the consequences. The remeasurement indications 1020, shown in FIGS. 1c and 1d are based on the evaluation of the measured data, and therefore "only" indicate where and what is wrong with the measured data.

Figure 2A:
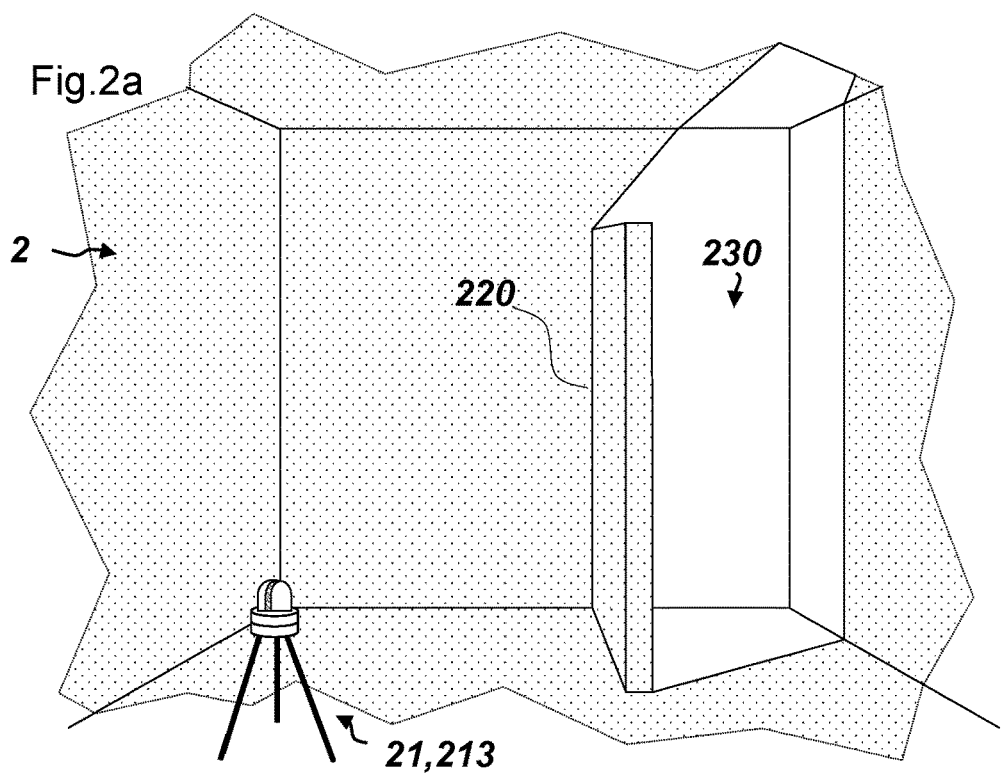
FIG. 2a-b: show a particular third embodiment of an AR-device, a surveying system, and a method in a further exemplary surveying situation, which leads to unsatisfactory measured data.

FIG. 2a shows a surveying situation in which an obstacle embodied as a wall 220 causes the room scan obtained with the laser scanner 21 to comprise a gap 230 and therefore to be incomplete. The laser scanner 21 may comprise a computer 213 for control, and in particular for data communication.

Figure 2B:
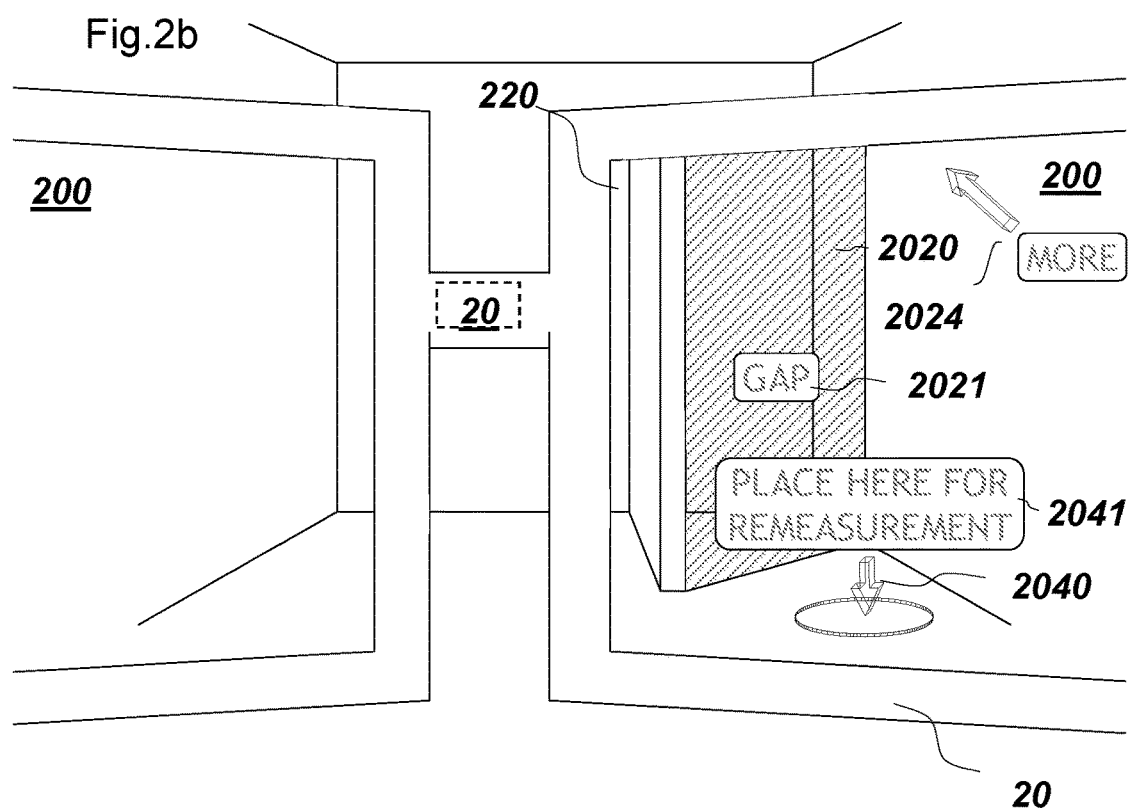

FIG. 2b shows a particular embodiment of the inventive AR-device, surveying system, or method, respectively. Here, remeasurement instructions are displayed on an AR-device spatially linked to the reference system at corresponding locations of the environment where a (the) surveying instrument (of the surveying system) is required to be set up for a remeasurement. This will guide the user of the AR-device in simple and ergonomic way, and provide him instructions on how to accomplish the remeasurement. The remeasurement instructions as shown in FIG. 2b are based on an analysis of the remeasurement indications in context of the structure of the environment, and therefore also guide the user how to achieve correction of the measured data. The total structure of the environment may be known and stored on a server or on the AR-device as a BIM (building information management) model, or may be obtained with the AR-device itself by performing a Visual Simultaneous Localisation and Mapping (VSLAM)-process. The analysis may comprise a countercheck with a photographic image of the measured scene captured by the visual sensor of the AR-device or a visual sensor comprised by a surveying instrument.

In VSLAM, which is very similar to Structure from Motion (SfM), the trajectory of the device and—often as a side product—the 3D structure of the surrounding environment is determined. The algorithm uses visual correspondences of features detected in images, in particular combined with other sensor data, e.g. inertial measurement units, as input. The correspondences can be established by algorithms like feature tracking or feature matching. Exemplarily, in an alternating process new poses of the AR-device are determined based on corresponding features and 3D-points representing the environment by resection, and new 3D-points are determined based on corresponding features and poses of the device by forward-intersection.

The AR-device in the example of FIG. 2b is an AR-glasses 20 having a display 200 configured to overlay AR-data, e.g. by a projector (not shown). As well, the AR-glasses 20 has a visual sensor (not shown) for capturing the environment and a computer 203 for reading and controlling the visual sensor, for determining a pose of the AR-device relative to the reference system, for at least one of receiving, generating and storing the AR-data, and for generating the overlays. For example, the visual sensor is a camera, in particular a camera configured to operate on visual light, (near) infra-red light, or thermal radiation. With similar equipment, the AR-device may be embodied as an AR-helmet.

In order to instruct the user of the AR-device 20 how to perform the remeasurement and therewith obtain measurement data from the gap (indicated with 2020), a remeasurement instruction 2040 is overlaid onto the view of the environment. Optionally, a tag 2041 explains the instruction 2040. The placement of the remeasurement instruction 2040 is subject to an analysis of the remeasurement indication 2020 in context of the shape of the environment. In the shown example, the wall 220 is taken into account. Also other factors are taken into account, e.g. features of a specific surveying instrument that require certain distances or angles.

Optional additional remeasurement indications 2024 are notifications that there are more AR-data to see beyond the current field of view of the user. In the shown case, an arrow and a tag are indicating that the shown measurement gap 2020 is extending further to the top. A tag 2021 may label the indication 2020.

Overlaying the remeasurement indications may also be used in a multi-user workflow: If two or more users equipped with an AR-device each carry out a measurement task simultaneously or shortly after each other at a site or on a larger work piece, each AR-device may provide overlaid information to the user about which measurements have already been performed or which are still missing.

The output of the evaluation of the measured data may also be used for quality control. In such an embodiment, said quality of measurement data does not or not only relate to completeness or density of measurements, but rather to a deviation of the actual measurement from a pre-defined geometry or layout. Accordingly, the AR-device is configured to overlay information (e.g. a color map) about the as-built-condition of a construction site or work piece while the measurements are carried out or after the measurements have been carried out. The evaluation may also be processed to report on at least one of the efficiency of the surveying instrument, tracking deviations, changes in performance, user performance, and a comparative amount of errors or remeasurements. The output of the evaluation of the measured data may also be used for machine learning enhancement for an automatic or robotic measurement. This may imply that the computer of the surveying instrument or a coordinating server is configured to learn from such remeasurement indications (i.e. failures in measurement quality) in order to provide higher quality measurements in the future, e.g. by an improved positioning of the surveying instrument or an improved choice of a surveying instrument based on the surveying conditions (such as topography, geometry, indoor or outdoor climate).

Relating to all shown and specified examples, the following steps may be continuously performed by the computer of the AR-device:

determining a pose of the AR-device relative to a reference system, generating and providing overlays according to a remeasurement indications onto a real view of the environment provided by a display of the AR-device, wherein the remeasurement indications are spatially linked to the reference system, reading and controlling a visual sensor of the AR-device, reading and controlling a pose sensor of the AR-device, and performing a Visual Simultaneous Localisation and Mapping (VSLAM)-process.

The real view provided by the display may be embodied by transparent glasses or a transparent hood allowing the user to look through and one-to-one see the reality, or by a screen reproducing the reality by displaying the output of a camera capturing the reality allowing the user to see the reproduction of the reality.

At least one of the evaluation of the measured data, the generation of the remeasurement indications, and the analysis of the remeasurement indications may be performed by at least one of the AR-device 20, the surveying instrument 21, and a server (not shown). In a particular embodiment, at least one of the evaluation and the analysis is based on an output of the visual sensor.

The AR-device according to the invention may be provided with the measured data by the measured data being transmitted to the AR-device, e.g. from a server or from the surveying instrument itself. The AR-device may process the evaluation of the measured by itself, or the results of the evaluation may be transmitted to the AR-device, e.g. from a server or from the surveying instrument itself.

Although the invention is illustrated above, partly with reference to some preferred embodiments, it must be understood that numerous modifications and combinations of different features of the embodiments can be made. All of these modifications lie within the scope of the appended claims.

What is claimed is:

1. An Augmented Reality (AR)-device, comprising:
   a visual sensor configured for capturing an environment of the AR device;
   a display configured for providing:
      a real view of the environment, wherein a reference system is linked to the environment, and
      overlays onto the real view according to AR-data, wherein the AR data are spatially linked to a reference system, and comprise designed data and measured data; and
   a computer configured for:
      reading and controlling the visual sensor,
      determining a pose of the AR-device relative to the reference system,
      at least one of receiving, generating and storing the AR-data, and
      generating the overlays;
   wherein the AR-data further comprise remeasurement indications which are:
      based on an evaluation of the measured data in terms of quality, and spatially linked to the reference system at corresponding locations of the environment where the measured data lack a target quality.

2. The AR-device according to claim 1, wherein the AR-data further comprise remeasurement instructions which are:
based on an analysis of the remeasurement indications in context of the structure of the environment, and
spatially linked to the reference system at corresponding locations of the environment where a surveying instrument is required to be set up for a remeasurement.

3. The AR-device according to claim 1, wherein the evaluation is adapted to match the quality of the measured data with the target quality.

4. The AR-device according to claim 1, further comprising:
a pose sensor configured for tracking a position and an orientation of the AR-device, wherein the computer is further configured for reading and controlling the pose sensor.

5. The AR-device according to claim 1, wherein the computer is further configured for performing a Visual Simultaneous Localization and Mapping (VSLAM)-process.

6. The AR-device according to claim 1, wherein the computer is further configured for at least one of:
receiving results of the evaluation,
receiving results of the analysis,
processing the evaluation, and
processing the analysis.

7. A surveying system comprising:
an Augmented Reality (AR)-device, comprising:
a visual sensor configured for capturing an environment of the AR device;
a display configured for providing:
a real view of the environment, wherein a reference system is linked to the environment, and
overlays onto the real view according to AR-data, wherein the AR data are spatially linked to a reference system, and comprise designed data and measured data;
a computer configured for:
reading and controlling the visual sensor,
determining a pose of the AR-device relative to the reference system,
at least one of receiving, generating and storing the AR-data, and
generating the overlays;
wherein the AR-data further comprise remeasurement indications which are based on an evaluation of the measured data in terms of quality, and are spatially linked to the reference system at corresponding locations of the environment where the measured data lack a target quality; and
a surveying instrument configured for:
generating measured data of the environment and
transmitting the measured data to the AR-device.

8. The surveying system according to claim 7, wherein the surveying instrument is configured for at least one of:
processing the evaluations,
transmitting the results of the evaluation to the AR-device,
processing the analysis,
transmitting the results of the analysis to the AR-device.

9. A method for providing indications of locations to be remeasured to a user of an Augmented Reality(AR)-device, the method comprising:

capturing an environment of the AR-device using a visual sensor of the AR-device;
determining a pose of the AR-device relative to the reference system;
providing a real-view of the environment on a display of the AR-device, wherein a reference system is linked to the environment;
generating and providing overlays onto the real view on the display according to AR-data, wherein the AR data are spatially linked to a reference system, and comprise designed data and measured data;
evaluating the measured data in terms of quality;
generating the remeasurement indications based on the evaluation of the measured data, wherein the remeasurement indications are spatially linked to the reference system at corresponding locations of the environment where the measured data lack a target quality; and
providing the remeasurement indications as overlays on the display of the AR-device.

10. The method according to claim 9, further comprising:
analyzing the remeasurement indications in context of the structure of the environment, and
generating the remeasurement instructions based on the analysis of the remeasurement indications, wherein the remeasurement instructions are spatially linked to the reference system at corresponding locations of the environment where a surveying instrument is required to be set up for a remeasurement.

11. The method according to claim 9, wherein at least one of:
evaluating the measured data,
generating the remeasurement indications,
analyzing the remeasurement indications, and
generating the remeasurement instructions,
is performed by at least one of:
the AR device,
a surveying instrument of a surveying system including the AR-device, and
a server.

12. The method according to claim 9, wherein the measured data are provided to the AR-device by at least one of:
generating the measured data with the visual sensor of the AR device,
generating the measured data with the surveying instrument and transmitting the measured data from the surveying instrument to the AR-device,
transmitting the measured data from a server to the AR-device, and
storing the measured data on the computer of the AR-device.

13. The method according to claim 9, wherein the results of the evaluation are provided to the AR device by at least one of:
processing the evaluation with the computer of the AR-device, and
receiving the results of the evaluation with the AR device from at least one of a surveying instrument of a surveying system including the AR-device and a server.

14. The method according to claim 9, wherein the results of the analysis are provided to the AR device by at least one of:
processing the analysis with the computer of the AR device, and
receiving the results of the analysis with the AR device from at least one of a surveying instrument of a surveying system including the AR-device and a server.

15. A computer program product having computer-executable instructions for controlling and executing the method of claim 9, when being run by a computer of the AR-device.

* * * * *